Dec. 31, 1957 W. M. GRUBER 2,817,971
RECORDING SYSTEM FOR ROTOR UNBALANCE MEASURING APPARATUS
Filed Feb. 21, 1955 4 Sheets-Sheet 1

INVENTOR
Warren M. Gruber
BY
Synnestvedt & Lechner
ATTORNEYS

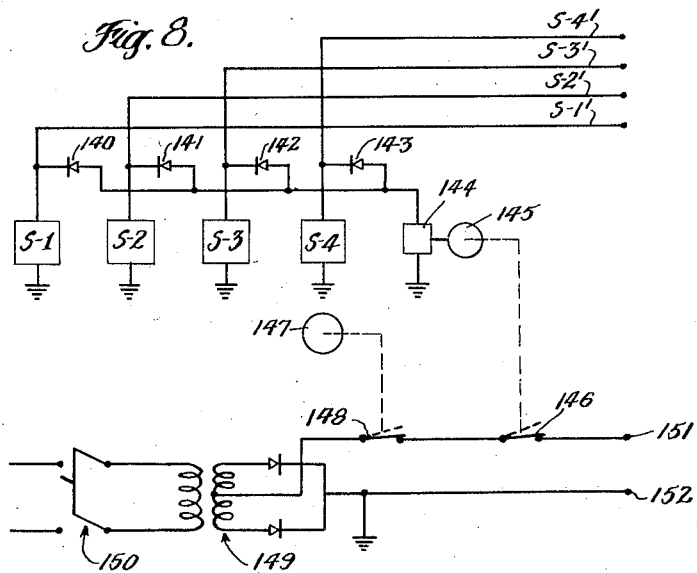
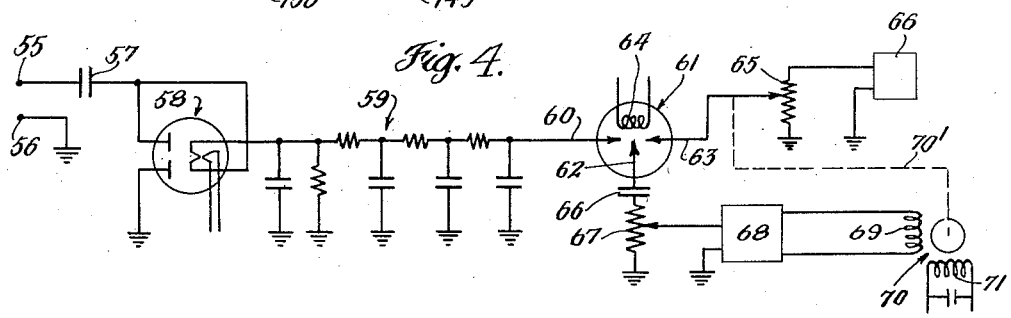
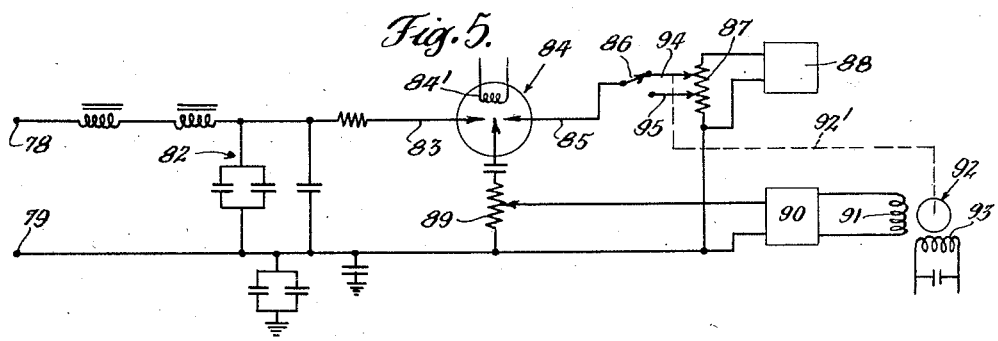

Dec. 31, 1957    W. M. GRUBER    2,817,971
RECORDING SYSTEM FOR ROTOR UNBALANCE MEASURING APPARATUS
Filed Feb. 21, 1955    4 Sheets-Sheet 3

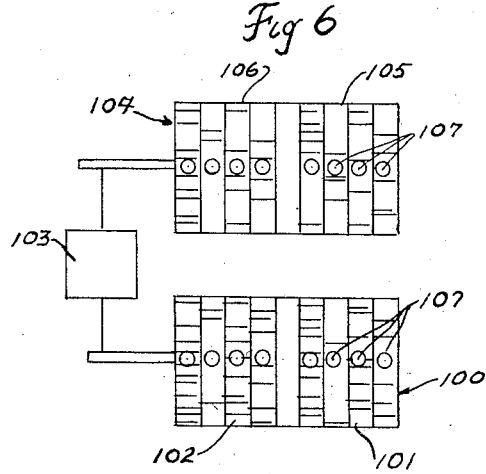

Fig 6

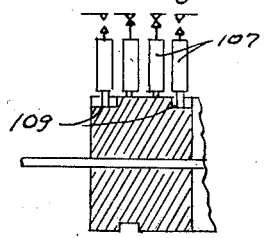

| DIGIT OR FUNCTION | RECORDER SOLINOIDS | | | |
|---|---|---|---|---|
| | S-1 | S-2 | S-3 | S-4 |
| 0 | | X | | X |
| 1 | X | | | |
| 2 | | X | | |
| 3 | X | X | | |
| 4 | | | X | |
| 5 | X | | X | |
| 6 | | X | X | |
| 7 | X | X | X | |
| 8 | | | | X |
| 9 | X | | | X |
| X | X | | X | X |
| RET. CARRIAGE | X | X | | X |
| TABULATE | | | X | X |

Fig. 10.

| SEQUENCE SWITCH KEY | |
|---|---|
| POSITION | FUNCTION |
| C | RIGHT UNBALANCE DETERMINATION |
| 1 | RET. CARRIAGE |
| 2 | TABULATE |
| 3 | 1ST DIGIT RIGHT MAGNITUDE |
| 4 | 2ND DIGIT RIGHT MAGNITUDE |
| 5 | TABULATE |
| 6 | X (MULTIPLIER) |
| 7 | 1ST DIGIT MULTIPLIER |
| 8 | 2ND DIGIT MULTIPLIER |
| 9 | TABULATE |
| 10 | 1ST DIGIT RIGHT ANGLE |
| 11 | 2ND DIGIT RIGHT ANGLE |
| 12 | 3RD DIGIT RIGHT ANGLE |
| 13 | LEFT UNBAL. DET. |
| 14 | TABULATE |
| 15 | 1ST DIGIT LEFT MAGNITUDE |
| 16 | 2ND DIGIT LEFT MAGNITUDE |
| 17 | TABULATE |
| 18 | X (MULTIPLIER) |
| 19 | 1ST DIGIT MULTIPLIER |
| 20 | 2ND DIGIT MULTIPLIER |
| 21 | TABULATE |
| 22 | 1ST DIGIT LEFT ANGLE |
| 23 | 2ND DIGIT LEFT ANGLE |
| 24 | 3RD DIGIT LEFT ANGLE |
| 25 | RET. CARRIAGE |

Fig. 11.

| REMARKS | RIGHT | | LEFT | |
|---|---|---|---|---|
| | MAG. | ANGLE | MAG. | ANGLE |
| TEST #1 | 28×10 | 345 | 67×10 | 185 |

INVENTOR
Warren M. Gruber
BY
Synnestvedt & Lechner
ATTORNEYS

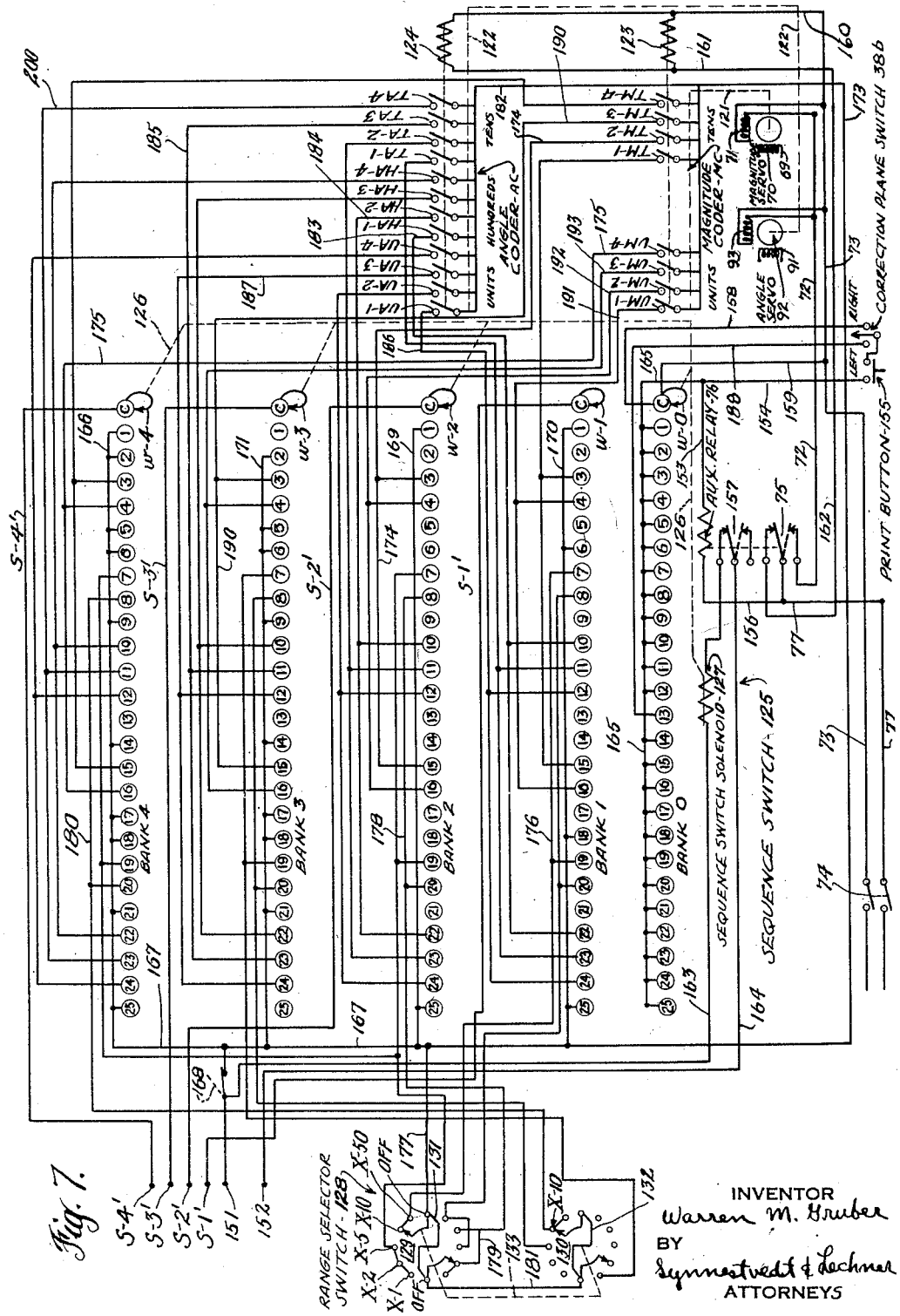

United States Patent Office 2,817,971
Patented Dec. 31, 1957

2,817,971

RECORDING SYSTEM FOR ROTOR UNBALANCE MEASURING APPARATUS

Warren M. Gruber, Horsham, Pa., assignor to Tinius Olsen Testing Machine Company, Willow Grove, Pa., a corporation of Pennsylvania Application February 21, 1955, Serial No. 489,703

11 Claims. (Cl. 73—462)

This invention relates broadly to testing equipment and, in particular, relates to a system for permanently recording information relating to a condition of a test article.

The invention will be described in connection with a system for permanently recording information relating to the magnitude and angular location of dynamic unbalance in a test article.

For dynamic balancing work, the invention contemplates a test station including means for suitably mounting a test article together with unbalance signal generators which is remotely located from a supervisory station. The supervisory station includes equipment for automatically determining and indicating the magnitude and location of unbalance in accordance with signals from the test station, together with mechanism to control an automatic typewriter for effecting the printing of the unbalance information and for effecting carriage control. Also located at the supervisory station are the master controls for effecting independent operation of the determining mechanism at the test station and operation of the control mechanism at the supervisory station.

The invention is particularly useful in those instances where certain parts of the equipment for the testing of a specimen must be located at a place remote from the place where the test information is to be recorded although the invention is not limited to such an arrangement. For example, the invention has been applied in the recording of unbalance information for various types of ordnance projectiles, where for safety purposes, the test station and supervisory station must be remote from one another. For industrial applications, the invention may be applied, for example, in an automobile or engine manufacturing plant where it is desired that data on crankshafts being balanced be recorded at a supervisory station where it can be immediately used in process or production control systems.

The details of the invention will be apparent from the following description and drawings wherein:

Figure 4 is a diagram of a magnitude of unbalance memory circuit;

Figure 5 is a diagram of the angle of unbalance memory circuit;

Figure 6 is a diagrammatic view illustrating a type of mechanism for setting up a code in accordance with the magnitude or angle of unbalance;

Figure 6a is a diagrammatic view illustrating part of the mechanism of Figure 6;

Figure 7 is a circuit diagram illustrating certain control mechanism;

Figure 8 is a circuit diagram illustrating a power supply and certain other control mechanism;

Figures 9 and 10 are charts illustrating the functional correlation between certain units of the invention; and Figure 11 is a chart illustrating typical unbalance information printed on a test data sheet.

Figure 1:
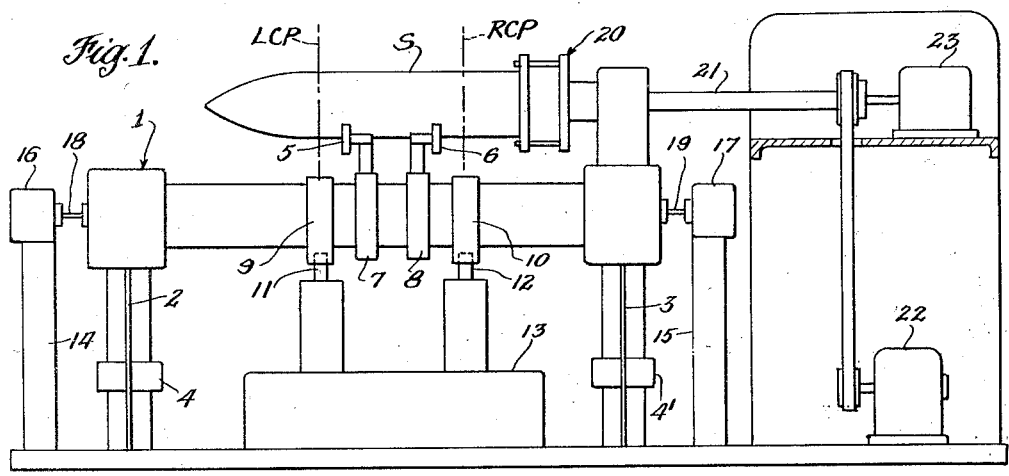
Figure 1 is an elevational view showing a machine for mounting an article to be tested for unbalance.

Figure 1 shows certain components of the system which may be located at the test station. A generally rectangular cradle 1 is supported at each end by a pair of elastic supports, one of each supports being indicated by the numerals 2 and 3. The cradle is provided with damping and tuning means indicated by the numerals 4 and 4'. A test article such as a shell or projectile S is rotatably supported on the rollers 5 and 6, which are attached to the cross members 7 and 8, slidably secured to the cradle. The cradle also has slidable cross members 9 and 10 which have holes for receiving the pivots 11 and 12, which are slidably mounted on the base 13.

At respective ends of the cradle are supports 14 and 15 carrying unbalance signal pickups 16 and 17, which normally comprise a relatively movable magnet and coil, the coil being secured to the cradle by means of rods 18 and 19. The cradle is also equipped with means generally indicated by the numeral 20 for coupling the shell or other test article to a drive shaft 21, which is adapted to be rotated by means of the motor 22. Also coupled to the drive shaft is a reference signal generator 23.

The pivots 11 and 12 are respectively mounted in the left correction plane LCP and the right correction plane RCP. When the pivot 12 is disengaged and the test article rotated, the cradle vibrates in the right correction plane around the pivot 11. At this time, the transducer 17 is operative and the relative motion between the magnet and the coil produces an unbalance signal. The reference generator also produces a signal and both of these signals are fed back to a supervisory station where the magnitude and location of unbalance in the right correction plane is measured and recorded.

When the pivot 11 is disengaged (with the pivot 12 engaged), the cradle vibrates in the left correction plane and the pickup 16 develops an unbalance signal. This signal, together with that of the reference generator, is fed back to the supervisory station for recording.

The operation of the balancing machine motor 22, the pivots and the pickups is controlled from the supervisory station as described following.

Figure 2:
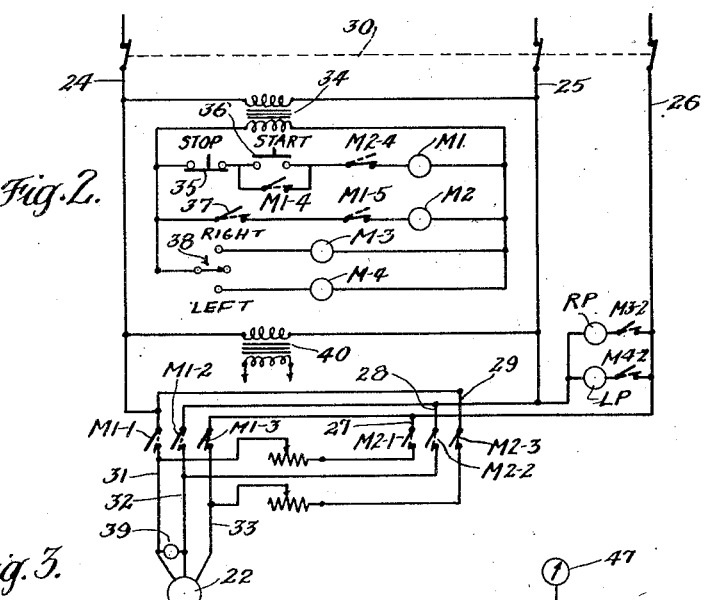
Figure 2 is a circuit diagram showing the manner by which certain elements of the machine of Figure 1 can be remotely controlled.

In Figure 2 the three-phase lines 24, 25 and 26 are directly connected to the contacts M1–1, M1–2 and M1–3 and are also connected via the lines 27, 28 and 29 to the contacts M2–1, M2–2 and M2–3. The lines 24, 25 and 26 may be connected to a power source by the gang switch generally indicated by the numeral 30. When the contacts M1–1, 2, 3 are closed and the contacts M2–1, 2, 3 are open, power is fed to the balancing machine motor 22 via the lines 31, 32 and 33. When the M1–1, 2, 3 contacts are open and the M2–1, 2, 3 contacts are closed, power is fed to the motor 22 in the reverse direction. This is for the purpose of braking the motor, as will be mentioned later.

Across the lines 24 and 25 is connected the primary of a step-down transformer 34 and across the secondary of the transformer is connected the motor start relay M–1, which is in series with a stop button 35, a start button 36 and the normally closed motor plug stop contacts M2–4. The motor start holding contacts M1–4 shunt the start button.

Also connected across the transformer is the motor plug stop relay M–2 which is in series with the normally closed motor start contacts M1–5 and the normally open plugging switch contacts 37.

The right auxiliary relay M–3 and the left auxiliary relay M–4 are connected across the secondary of the transformer through the switch 38.

The right pivot solenoid RP is connected across the lines 25 and 26 through the normally open right auxiliary relay contacts M3–2. The left pivot solenoid LP is also connected between the lines 25 and 26 through the normally open left auxiliary relay contacts M4–2. The two solenoids are connected with the pivots 11 and 12 and when energized, bring the respective pivots out of engagement.

Across the lines 31 and 32 to the balancing machine motor 22 is connected a plugging switch lock-out coil 39 which controls the operation of contacts 37 mentioned above. Also connected across the lines 24 and 25 is a transformer 40 which may be used for supplying power to the unbalance measuring system, which will be mentioned later in connection with Figure 3.

All of the above-mentioned components may be located at the supervisory station with the exception of the motor 22, coil 39 and solenoids RP and LP.

The above components operate in the manner described following.

When the switch 30 is closed, power is supplied to the transformers 34 and 40. Ordinarily, unbalance is first determined in the right correction plane so the switch 38 is moved to the right position to energize the relay M–3, which acts to close the contacts M3–2 and the right pivot solenoid RP picks up. This operates to disengage the right pivot 12. To start the balancing machine motor, the start button 36 is depressed and this picks up the motor start relay M–1. The holding contacts M1–4 close so that the relay M–1 will continue to be energized when the start button is released. The energizing of the motor start relay closes the contacts M1–1, 2, 3 and power is supplied to the balancing machine motor 22, which acts to rotate the test specimen mounted on the cradle.

It is pointed out here that the switch 38 is ganged to other switches for controlling certain other components of the invention. For example, the switch 38 is ganged to another switch (38a in Figure 3) which connects the pickups 16 and 17 for operation.

With the motor running, the coil 39 closes the contacts 37. However, with the relay M–1 energized, the contacts M1–5 are open so that the relay M–2 is de-energized.

When it is desired to stop the balancing machine motor, the stop button 35 is actuated. This causes the relay M–1 to be de-energized and the contacts M1–1, 2, 3 are open. The contacts M1–5 are closed and, therefore, the relay M–2 picks up. This causes the contacts M2–1, 2, 3 to close and power is supplied to the motor in the reverse direction, which tends to brake the motor and hence speed up the deceleration.

When the unbalance determination is to be made in the left-hand correction plane, the switch 38 is actuated to de-energize the relay M–3 and pick up the relay M–4. With M–3 de-energized and the relay M–4 energized, the contacts M3–2 open and the contacts M4–2 close. Thus, the right pivot is engaged and the left pivot is disengaged. Also, the pickup 16 is arranged for operation.

Figure 3:
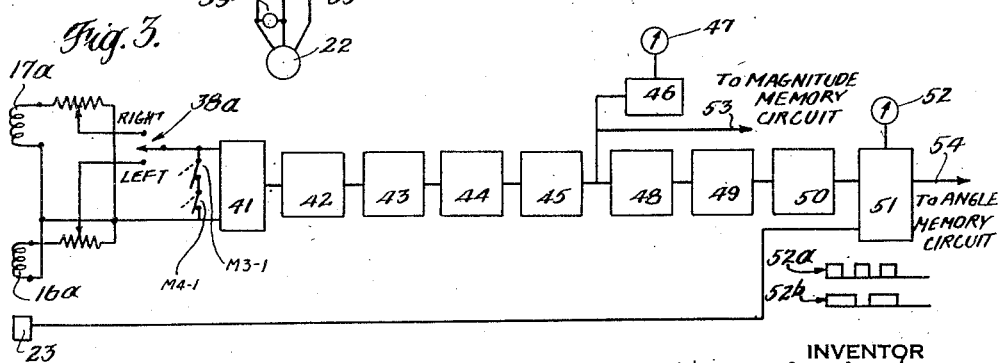
Figure 3 is a block diagram showing various components of a mechanism to measure and indicate magnitude and angle of unbalance.

The system for measuring the magnitude and location of unbalance in each correction plane is shown generally in Figure 3. This system is described in detail in copending application of John Reed Stovall, Jr. and Irving Weintraub, Serial No. 233,294, filed June 25, 1951, and entitled Apparatus for Determining Dynamic Unbalance, and assigned to the assignee of the present invention, which application matured into Patent No. 2,783,648 on March 5, 1957.

While the system for measuring magnitude and location of unbalance is described in the above-mentioned application, a brief mention of the general operating characteristics will be made here.

As seen in Figure 3, one side of the coil 17a of the right correction plane transducer 17 is connected via a calibrating potentiometer to a switch 38a, which is ganged to the switch 38 mentioned above. The movable contact of the switch 38a is connected to an angle shifter 41. The other side of the coil 17a is also connected to the angle shifter. One side of the coil 16a of the left correction plane transducer 16 is connected to the switch 38a and the other side is connected to the angle shifter 41. As will be apparent, if the switch 38a is shifted to the right-hand position, the signal developed by the coil 17a will be fed to the angle shifter. The coil 16a, of course, will be disconnected. If the switch 38a is shifted to the left-hand position, the signal developed by the coil 16a will be fed to the angle shifter, while the coil 17a is disconnected.

When the balancing machine is inoperative, it is desirable, in the particular system used, to short-circuit the pickup coils 16a and 17a. For this purpose, the normally closed contacts are provided across the input to the angle shifter 41. These comprise contacts M3–1 and M4–1. When either of the relays M–3 or M–4 is energized as described above, one or the other of the contacts M3–1 and M4–1 is open to unshort the coils.

When one or the other of the pickups is operative, a sinusoidal signal is fed to the angle shifter 41, which essentially is a double-pole, double-throw switch. This switch is for the purpose of shifting the phase of the signal 180° because, for unbalance location near zero or 360° (as measured from some known rotational position) the measuring circuit may be somewhat unstable.

From the angle shifter the unbalance signal is fed to an amplifier 42, thence to a filter 43, the purpose of which is to filter out any 60-cycle hum developed in the first amplifier stage. From the filter, the signal goes to the attenuator 44, which essentially is a voltage divider and is used to adjust the magnitude of the signal as desired. From the attenuator 44, the signal is further amplified in amplifier 45. The amplified signal is then fed to a rectifier 46, the rectifier being connected to a meter 47 which indicates the amount or magnitude of unbalance.

The signal from the amplifier 45 is also fed to a clipper 48, where the positive and negative portions of the sinusoidal signal are clipped and a square wave generated. The square wave is then fed to a differentiator 49, which develops a train of pulses which appear in time at the positive-going crossover point of the sinusoidal signal. These pulses are fed to a pulse selector 50, which cuts out the positive pulses and the negative pulses are fed to an angle detector 51.

The reference generator 23 also develops a train of negatively-going pulses, one pulse occurring each time the article under test passes a known rotational position. This train of pulses is fed to the angle detector 51.

The reference generator 23 may be a cam-operated switch or, in some instances, it may be preferable to use a sine wave generator and feed this signal to a pulse-forming circuit located at the supervisory station. For example, see copending application of Sylvester Karpchuk and Warren M. Gruber, Serial No. 498,979, filed April 4, 1955.

The pulses above-mentioned are of the same frequency and if there is a difference in phase (caused by unbalance), the angle detector develops a signal proportional to the time interval. This signal then is proportional to the angular location of unbalance which is indicated on the meter 52. If the angle is small, the signal fed to the meter 52 appears as indicated at 52a, while if the angle is large, the signal appears as indicated at 52b.

All of the above-mentioned components with the exception of the pickup coils 16a and 17a and the signal generator 23, may be located at the supervisory station.

The signal from the amplifier 45 is taken off, as indicated at 53, and fed to a magnitude memory circuit. The signal from the angle detector 51 is taken off, as indicated at 54, and fed to an angle memory circuit. These memory circuits will be described in connection with Figures 4 and 5.

In Figure 4 the A. C. signal from amplifier 45 appears at terminals 55 and 56, and this signal is fed through a blocking capacitor 57 to a full-wave rectifier generally indicated by 58, thence to a filter system generally indicated by 59, and the D. C. signal from the filter appears on terminal 60 of the converter 61. The contact arm 62 of the converter vibrates between terminal 60 and terminal 63 by means of A. C. power supplied to the coil 64. The terminal 63 is connected by a potentiometer 65, which is supplied with a known D. C. voltage from a standard cell 66. By adjusting the movable arm of the potentiometer, a known D. C. voltage will appear at the terminal 63.

The movable arm 62 of the converter oscillates back and forth and compares the magnitude of the voltages appearing on terminals 60 and 63. If the voltages are of unequal magnitude, an A. C. signal will be developed across the potentiometer 67 by the charge and discharge of the capacitor 66. This signal is fed to an amplifier 68, which is connected to one coil 69 of a servo motor generally indicated by 70, the shaft of the servo being connected to the movable arm of the potentiometer 65, as indicated at 70′. The other coil 71 of the servo motor is fed with power from the same source as the coil 64. Depending upon the phase (with relation to the voltage applied to the coil 71) of the signal developed across the potentiometer 67, the servo motor will be turned clockwise or counter-clockwise to move the movable arm of the potentiometer 65 until the magnitude voltages appearing across the terminals 60 and 63 are equal in value. At this time, no voltage appears across the potentiometer 67 and the servo motor stops moving.

From the foregoing, it will be apparent that the angular position of the shaft of the servo motor 70 (or the position of the movable arm of the potentiometer 65) is proportional to or indicates the magnitude of unbalance. The manner in which this position is used will be mentioned hereinafter.

In Figure 5 the signal from the angle detector 51 appears on terminals 78 and 79. This angle signal is averaged out and the resulting signal is of a magnitude corresponding to the width of the square wave, i. e., corresponding to the angular location of unbalance. For this purpose, a filter arrangement generally indicated by the numeral 82 is provided and the averaged signal appears on terminal 83 of the converter 84. The terminal 85 is connected through switch 86 to the potentiometer 87, which is impressed with a known voltage from the standard cell 88. The movable arm of the converter is oscillated between the terminals 83 and 85 by the coil 84′. Any difference in the magnitude of the voltages appearing on terminal 83 and terminal 85 develops a voltage across the voltage divider 89 and the resultant signal is fed to an amplifier 90 connected to coil 91 of servo motor 92, the other coil 93 being supplied with power from the same source as coil 84′. The shaft of the servo motor 92 is connected, as indicated by the dotted lines 92′, to the movable arms 94 and 95 of the potentiometer 87.

When the magnitudes of the voltages appearing on terminals 83 and 85 are equal, the angular position of the shaft of the servo 92 is proportional to or indicates the angle of unbalance.

Heretofore, it was mentioned that where the angle of unbalance is near zero or 360°, the circuit may be unstable. This instability can be rectified by actuation of the angle shifter 41, which shifts the phase of the signal from the pickup 180°. If the angle shifter is operated, the magnitude of the signal appearing on terminal 83 will either increase or decrease. The output from the angle detector 51 is essentially linear with respect to increasing angle and if the location, for example, of unbalance were near 360°, operation of the angle shifter would reduce the voltage on terminal 83 by about fifty percent. This reduction in voltage, of course, would then make the servo motor 92 operate as if the angle of unbalance were located 180° from the actual position. In order to compensate for this, I have included the switch 86, which effects a corresponding reduction in the voltage appearing on terminal 85 of the converter. With the voltages on terminals 83 and 85 reduced (or increased) the same amount, the servo will not shift from the true position. The potentiometer 87 is wound generally in cylindrical form with the arms 94 and 95 approximately 180° apart. Thus, if arm 94 were on a position corresponding to approximately 360° of unbalance, operating the switch 86 to interconnect arm 95 with terminal 85 of the converter would reduce the signal by approximately fifty percent. The switch 86 is ganged with the knob controlling the angle shifter 41.

The coils 71 and 93 of the servo motors 70 and 92 are supplied with power as described following. As seen in Figure 7, the coils are connected to the lines 72 and 73, the line 73 being connected to the switch 74 and the line 72 being connected by the contacts 75 of the auxiliary relay 76 to the line 77, which is connected to the switch 74. The switch 74 is adapted to be connected to a standard commercial power source. As will be apparent, when the contacts 75 are in the position shown by the solid line, the power connection to the servo motor coils is interrupted, and when the contact is in the position shown by the dotted lines, the circuit to the servos is closed. The manner in which the auxiliary relay 76 operates to effect opening and closing of this circuit will be described hereinafter.

Preferably, the recorder used in the system of the invention is an automatically-operating typewriter. Typewriters of the kind in question are shown in Patents 2,294,722, 2,700,446 and 2,700,447. In general, such typewriters include a plurality of keys, the actuation of which causes the desired function such as printing of a character, tabulating or return of the typewriter carriage. Each key has an actuating member usually called a seeker. The movement of a seeker is controlled by a plurality of stacked permutation bars, each having a series of slots arranged in a predetermined manner. Depending upon which combination of bars is actuated, certain slots will be lined up such that one seeker may be actuated to be moved therethrough and hence operate its connected type. Each permutation bar is spring-loaded and held in a "home" position by a solenoid. When the solenoid is energized, the permutation bar is permitted to slide. Thus, by selectively energizing solenoids, one or a combination of bars may be made to slide to appropriately line up the slots for the movement of a seeker. When any one of the permutation solenoids is energized, a control magnet is energized which acts to connect the selected seeker to a power element for moving the same sufficiently to cause the desired function.

In the system of the present invention, these solenoids are adapted to be selectively energized from a power source in a manner so that at predetermined times the typewriter is caused to print desired characters or the carriage is caused to tabulate or return. A sequence switch is interconnected between the solenoids and the power source, the switch being adapted to automatically step through a plurality of positions, each position making a desired circuit interconnection between the solenoids and the power source. For example, in some positions, the sequence switch directly selectively connects solenoids with the power source so that the carriage tabulates or returns. In other positions, the sequence switch interconnects the coils with coder mechanism which has been automatically set up in accordance with, say, the angle of unbalance and operates to selectively cause energizing of the solenoids so that the particular angle will be printed. The sequence switch also is effective in dividing the cycle of operation of the equipment of the invention into a test portion wherein the unbalance determining mechanism operates while the recording mechanism is dormant and into a recording portion wherein the determining mechanism is dormant and the recording mechanism is operative.

The typewriter is operated to print the following information. For example, in the right correction plane, the amount information is printed, this being a digit or number between 00 and 99. Then the scale range is printed. This is done by printing a character such as "x" to indicate multiplication, followed by a multiplying factor which is a digit between 00 and 50, depending on the setting of attenuator 44. The angle information is then printed, this being some digit between 000 and 360. Similar information is then printed for the left correction plane.

Typical mechanism for setting up a code in accordance with the magnitude or angular location of unbalance is somewhat diagrammatically shown in Figure 6. A drum 100 is adapted to be driven by a servo motor, whose shaft orientation corresponds to magnitude or angle of unbalance. This drum has two portions 101 and 102, which are respectively coded for units and tens. The drum 100 is connected by gearing generally indicated by 103 to a second drum 104 having portions 105 and 106 respectively coded in hundreds and thousands. The gearing 103 is arranged such that one revolution of drum 100 corresponds to $1/100$ of a revolution (one position) of drum 104. Preferably, a binary decimal code is used so there are eight annularly-arranged codes for each drum. For example, four of such codes are arranged on the portions 101, 102, 105 and 106. Associated with each of the codes on the portions 101, 102, 105 and 106 are feeler operated switches generally indicated by 107.

The codes appearing on the drums are made up by sculpturing the periphery in the form of hills and valleys, and when the servo motor has positioned the drums, all of the feelers are simultaneously moved downwardly. As illustrated in Figure 6a, some feelers will drop in valley 109, while others will not. Those feelers which do not drop in a valley close the switches associated therewith. The operation of the switches is used to energize circuits, as will be described later. All of the feelers associated with drums 100 and 104 are controlled by a solenoid which, when energized, moves the feelers into engagement with the respective drums.

One of the above-mentioned coders is associated with the magnitude servo 70, as indicated by MC in Figure 7, and another coder AC is associated with the angle servo 92. The drums of the coders are connected to the shafts of the servos as indicated by the dotted lines 121 and 122 in Figure 7.

For the magnitude coder MC, only sections corresponding to the sections 101 and 102 corresponding to units and tens of drum 100 are used, since the digit to be printed is somewhere between 00 and 99. For the angle coder AC, sections corresponding to the sections 101 and 102 on drum 100 are used together with a section corresponding to the section 105 of drum 104, since the digit to be printed is somewhere between 000 and 360.

On the magnitude coder the various switches operated by the respective feelers are indicated as UM–1, UM–2, UM–3, and UM–4, which correspond to the four switches associated with the feelers operative over the units section 101 of drum 100. The switches associated with the tens section of the magnitude coder are indicated as TM–1, TM–2, TM–3 and TM–4.

On the angle coder the switches associated with the units section are indicated as UA–1, UA–2, UA–3 and UA–4; with the tens section, as TA–1, TA–2, TA–3 and TA–4; with the hundreds section, as HA–1, HA–2, HA–3 and HA–4.

The feelers on the magnitude coder are adapted to be brought down into engagement with the drum by means of the solenoid 123 and the feelers on the angle coder are adapted to be brought down by the solenoid 124. The manner in which these solenoids are energized will be explained later.

The timing mechanism for controlling the various sequence of operations, i. e., when certain information is sent to the typewriter to control its operations, is embodied in the sequence switch 125, which is shown diagrammatically in Figure 7. This switch has a plurality of wafers or banks having corresponding positions or contacts which preferably are fixed. The banks are termed Banks 0, 1, 2, 3 and 4 and the various contact positions thereon are indicated as 1 through 25. Each bank is generally circular in shape (but shown as being straight for descriptive purposes) and has a common operating shaft indicated by the dotted lines 126. This shaft controls the operation of the contacts or wipers $w$–0, $w$–1, $w$–2, $w$–3 and $w$–4. The switch is actuated or operated by causing the shaft to be adjusted or rotated so that the respective wipers step from one position to another. This is done by means of the sequence switch solenoid 127. The manner in which this solenoid is operated to step the switch will be mentioned later.

Also shown in Figure 7 is an adjustable range selector switch 128 which has two wafers generally indicated by the numerals 129 and 130, together with wipers 131 and 132, which are ganged together as indicated by the dotted lines 133 for movement over the contact positions.

The wipers 131 and 132 are ganged to the attenuator 44. The various contact positions on the wafers for different settings of the attenuator are indicated by X–1, X–2, X–5, X–10 and X–50.

Also shown in Figure 7 is the correction plane switch 38b, which is ganged to the switch 38 mentioned heretofore. This switch has left and right positions as is indicated.

In Figure 8 I have shown four permutation solenoids S–1, S–2, S–3 and S–4, which are interconnected via lines S–1', S–2', S–3' and S–4' to the "C" positions of the respective banks of the sequence stepping switch.

To each of the lines S–1', 2', 3', 4' are connected the rectifiers 140, 141, 142 and 143, which are commonly connected to the control solenoid 144. When any of the solenoids S–1, S–2, etc., is energized, the control solenoid is also energized. The solenoid operates a clutch 145 which actuates certain mechanism in the typewriter. The switch 146 is connected to the clutch so that when the control solenoid 144 is energized, the switch 146 is momentarily opened.

The typewriter is equipped with mechanism indicated at 147 which is operative during the return or tabulation of the carriage. The switch 148 is connected to be opened during tabulation or carriage return.

The switches 146 and 148 are in the power supply circuit which is energized by means of the rectifier-transformer combination generally indicated by the numeral 149, the transformer being energized through the switch 150, which is adapted to be connected to the commercial supply. The power supply arrangement provides for —48 volts D. C. to be on line 151 and +48 volts on line 152.

Various of the power supply switches, i. e., 30 in Figure 2, 150 in Figure 8, and 74 in Figure 7, may be ganged together and provided with appropriate fusing.

In Figure 9 I have shown the various digits which are printed or the function performed by the typewriter when one or various combinations of the solenoids S–1, S–2, etc., are energized.

In Figure 10 I have shown the various functions performed by the typewriter when the wipers of the sequence switch are in the various positions.

In Figure 11 I have shown matter (underlined) which may be automatically printed on a data sheet. Under the Remarks column, the test serial number or other information may be manually typed in before the testing operation.

The operation of the system will be explained following.

Assume first that all of the power supply switches are in the "on" position and that the switches 38 in Figure 2, 38a in Figure 3, and 38b in Figure 7 are in the "mid" or "off" position. Also assume that the range selector switch 128 in Figure 7 has been turned to some position, for example, position X–10 as indicated. Also assume that a test article has been loaded on the cradle and appropriately coupled with the balancing machine motor 22 and that the various wipers w–0, w–1, etc., on the sequence switch 125 are in the "C" position. Also assume that the test number has been manually typed on the data sheet.

The explanation of the operation will be done by tracing through the operations with the wipers of the sequence switch on the various positions (see Figure 10).

C. *Right correction plane unbalance determining operation*

For the unbalance determination in the right correction plane, the switches 38, 38a and 38b are turned to the right-hand position. With switch 38 in the right-hand position, the right pivot 12 is released and the pickup 17 is connected for operation. Also, the balancing machine motor 22 is energized.

In the "C" position of the wiper w–0, the auxiliary relay 76 is de-energized, as will be apparent from the following. One side of the auxiliary relay is connected by line 156 to line 77, interconnected to the switch 74. The other side of the relay is connected to the line 153, interconnected to line 154, which is open at the print button 155. Also, the line 153 is connected to the line 165, which is open. With the auxiliary relay de-energized, the movable arm of the lower contact 75 is in the position shown by the dotted lines and power is supplied to the servo coils 71 and 93 as mentioned heretofore. The movable arm of the upper contacts 157 of the auxiliary relay also occupies the dotted line position.

With the above connection made, the magnitude and the angular location of unbalance in the right correction plane are automatically indicated on the meters 47 and 52 and the memory circuits described in Figures 4 and 5 position the shafts of the magnitude servo 70 and angle servo 92 to correspond to the magnitude and angle of unbalance. The shafts of the servos then position the respective drums of the magnitude coder MC and the angle coder AC.

The determination of unbalance in the right-hand correction plane takes only a matter of a few seconds with the type of equipment described and after this operation is completed, the print button 155 is depressed to start the automatic cycle of operations.

When the print button is depressed, the auxiliary relay 76 picks up through line 153, line 154, the print button, the correction plane switch 38b, the line 158 and wiper w–0, and line 159, which is connected to power line 73. The movable arms of the contacts 75 and 157 of the auxiliary relay move to the position shown by the full lines. The opening of contacts 75 de-energizes the coils 71 and 93 of the servo motors so that the shafts, hence, the magnitude and angle coder drums, are locked in position.

With the movable arm of the contact 75 in the position shown by the full line, the magnitude coder solenoid 123 and angle coder solenoid 124 are energized so that the respective feelers move downwardly. This takes place as follows. One side of each of the solenoids 123 and 124 is connected to a line 160, which is connected to power line 73. The other side of each of the solenoids is connected to line 162, which is connected to the lower contact 75 in communication with the power line 77.

When the upper contacts 157 of the auxiliary relay move into the position shown by the full line, the circuit of the sequence switch of solenoid 127 is energized. This circuit includes the lines 163 and 164 connected to supply lines 151 and 152. Energizing of the solenoid sets up the connection to the shaft 126 for the various wipers such that when the solenoid is de-energized, the wipers will step from position "C" to position 1.

When the print button is released, the auxiliary relay 76 is momentarily de-energized, which causes contacts 157 to drop out, which de-energizes the sequence switch solenoid and the arms w–0, w–1, etc., are stepped from position "C" to position 1. In position 1 the auxiliary relay is again energized through the lines 153, 165, wiper arm w–0 and line 159. This closes contacts 157 and again energizes the sequence switch solenoid 127. Also, the contacts 175 are in the position shown by the full line so that the coils 71 and 93 of the servo motors continue to be de-energized and the solenoids 123 and 124 continue to be energized. The momentary drop-out of the auxiliary relay when the print button is released is very short, so that the shafts cannot re-position themselves, nor can the solenoids 123 and 124, to move the feelers away from the drums.

From an inspection of Bank 0, it will be seen that the positions 1 to 12 and 14 to 25 are connected to line 165. Thus, as the wiper w–0 is stepped, the auxiliary relay remains energized except on position 13 and for the short interval of time between positions.

When the wipers of the sequence switch are stepping, the switch 168 opens, and when the step is completed, the switch closes. This is for the purpose of opening the negative supply to the line 167 so that the typewriter will not accidentally function. Line 167 will be termed hereinafter as the "negative supply line."

1. *Carriage return*

Since the test number or the like has been manually typed, the carriage must be returned to "start" position. This is done by energizing solenoids S–1, S–2 and S–4 (see Figure 9).

As seen in Figures 7 and 8, the solenoid S–4 is connected to line S–4', which is connected to position "C" and the wiper arm w–4. Position 1 is connected to line 166, which is connected to line 167, interconnected through a normally closed switch 168, to line 151 at a potential of —48 volts. The solenoid S–2 is connected via line S–2' to position "C" and the wiper w–2 on Bank 2. Position 1 is connected to line 169, which is connected to negative supply line 167. The solenoid S–1 is connected via line S–1' to position "C" and wiper w–1 on Bank 1. Position 1 is connected to line 170, which is connected to negative supply line 167. Thus, when the wipers w–1, w–2 and w–4 move from positions "C" to positions 1, the solenoids S–1, S–2 and S–4 are directly energized from the power supply and effect a return of the carriage.

When the carriage is returning, the switch 148 is open and this de-energizes the sequence switch solenoid 127, which effects the stepping of the wipers w–0, w–1, etc., from position 1 to position 2. When the carriage has completed its return, the switch 148 closes and the solenoid 127 is energized. The wipers remain on position 2 until the sequence switch solenoid 127 is again de-energized.

It is to be noted here that even if no information were manually typed under the Remarks section so that the carriage were at its "home" position, the wipers would still step from position 1 to position 2. When the solenoids S–1, S–2 and S–4 are energized (on position 1), the clutch solenoid 144 is also energized and the switch 146 opens. This then would cause de-energizing of the solenoid 127 and effect stepping.

The reason for having the switch 148 in the sequence switch solenoid circuit is because tabulation and return of the carriage take a longer time than does stepping of the switch. Thus, it is necessary to keep open the —48 volt supply circuit during this interval. Otherwise, the typewriter might be caused to perform another operation while the carriage was tabulating or returning.

2. Carriage tabulates

On position 2 the carriage tabulates and this is accomplished by energizing the solenoids S–3 and S–4. The solenoid S–4 is energized in the same manner as described above. The solenoid S–3 is connected through line S–3', position "C" and wiper w–3 on Bank 3. Position 2 on Bank 3 is connected to the line 171 which is connected to the negative supply line 167. As the carriage is tabulating, the switch 148 is open and this causes the sequence switch solenoid 127 to be de-energized. This effects stepping of the switch from position 2 to position 3. When the carriage is finished tabulating, the switch 148 closes so that the sequence switch solenoid is again energized.

3. Print first digit right magnitude

As seen in Figure 11, the first character to be printed is the tens digit "2," and for this purpose, the solenoid S–2 is energized as indicated in Figure 9. The interconnection between the solenoid S–2 and the negative power supply is made through the switch TM–2 in the tens section of the magnitude coder MC and the stepping of the wiper w–2 to position 3.

The lower contact of switch TM–2 is connected to a line 172, connected to line 173, which is interconnected to the negative supply line 167. (Incidentally, all of the lower contacts of the feeler switch associated with the magnitude coder are connected to the line 172.) The upper contact of switch TM–2 is connected to a line 174, which is interconnected to position 3 on Bank 2 of the sequence stepping switch. Thus, when the wiper w–2 moves on to position 3, the —48 volts is supplied through switch TM–2, the wiper w–2, the line S–2' to the solenoid S–2. At the same time, the clutch solenoid 144 is energized (since it is connected to line S–2') and this effects opening of the clutch switch 146. When the clutch switch opens, the sequence switch solenoid 127 is de-energized and this causes stepping of the wipers w–0, w–1, etc., from positions 3 to positions 4.

4. Print second digit right magnitude

The next character to be printed is the units digit "8," and for this purpose the solenoid S–4 is energized. The switch UM–4 on the units section of the magnitude coder is closed. The upper contact of the switch is connected via line 175 to position 4. When the wiper w–4 moves onto terminal 4, the solenoid S–4 is energized, which effects the printing of the numeral 8. When the solenoid S–4 is energized, the clutch solenoid 144 is energized and this causes switch 146 to open and de-energize the sequence switch solenoid, which steps the switch from position 4 to position 5.

5. Tabulate

For tabulating purposes, the solenoids S–3 and S–4 are energized. The positions 5 on the Banks 3 and 4 of the sequence switch are directly connected by lines 171 and 166 to the supply line 167. Thus, when the wipers w–3 and w–4 move into position 5, these solenoids are energized, which effects the tabulation of the carriage. As the carriage is tabulating, the switch 148 opens, which causes the sequence switch solenoid 127 to be de-energized and this effects the stepping of the sequence switch from positions 5 to positions 6.

6. Multiply

For printing the letter x (which indicates multiplying), the solenoids S–1, S–3 and S–4 are energized. Positions 6 on Banks 1, 3 and 4 of the sequence switch are interconnected via lines 170, 171 and 166 to the supply line 167. Thus, when the wipers w–1, w–3 and w–4 move into their respective positions, the solenoids S–1, S–3 and S–4 are energized, which causes the printing of the letter x. The clutch solenoid 144 is energized at this time, and this causes the switch 146 to open, which de-energizes the sequence switch solenoid 127 and effects stepping of the wipers w–0, w–1, etc., of the sequence switch from positions 6 to positions 7.

7. Print first digit multiplier

The digit to be printed following the letter x will depend upon the setting of the range selector switch 28. This is shown on position indicating a factor of 10 and, therefore, this numeral is printed. For printing the numeral 1, the solenoid S–1 is energized.

The position 7 on Bank 1 is interconnected via line 176 to terminal X–10 on the upper wafer 129 of the range selector switch. The wiper 131 is interconnected via the "off" terminal and line 177 to the negative supply line 167. Thus, when the wiper w–2 moves from position 6 to position 7, the solenoid S–1 is energized and the numeral 1 is printed. The switch 146 is opened as previously described and the sequence switch solenoid 127 is de-energized. This causes the wipers w–0, w–1, etc., to move from positions 7 to positions 8.

8. Print second digit multiplier

For printing the numeral 0, the solenoids S–2 and S–4 are energized. The position 8 on Bank 2 is connected via line 178, line 179, wiper 131 and line 177 to the negative supply line 167. The position 8 on Bank 4 is connected via the line 180 to the terminal X–10 on the lower wafer 130 of the range selector switch through the wiper 132, line 181, through the wiper 131 and line 177 to the negative supply line 167. Thus, when the wipers w–2 and w–4 move from positions 7 to positions 8, the solenoids S–2 and S–4 are energized and printing of the numeral 0 is effected. This causes de-energizing of the sequence switch solenoid in a manner described and the wipers w–0, w–1, w–2, etc., move from positions 8 to positions 9.

9. Tabulate

As mentioned heretofore, tabulation requires the energizing of solenoids S–3 and S–4. The positions 9 on Banks 3 and 4 of the sequence switch are connected the same as positions 2 and, therefore, when the wipers w–3 and w–4 move from positions 8 to positions 9, the solenoids S–3 and S–4 are energized and the carriage tabulates. The sequence switch is de-energized by the opening of switch 146 and the wipers w–0, w–1, w–2, etc., move from positions 9 to positions 10.

10. Print first digit right angle

The next character to be printed is the hundreds digit "3," and this is accomplished by energizing of the solenoids S–1 and S–2. The lower contacts on the switches associated with the hundreds, tens and units sections on the angle coder drum are connected to a line 182, connected to line 173, which is in communication with the negative supply line 167. The switch HA–1 is closed and the top contact of this switch is connected by line 183 to position 10 on Bank 1. The switch HA–2 is closed and the top contact of this switch is connected by line 184 to position 10 on Bank 2. Thus, when the wipers w–1 and w–2 move from positions 9 to positions 10, the solenoids S–1 and S–2 will be energized and the numeral 3 will be printed. The switch 146 will be opened and the sequence switch solenoid de-energized to step the wipers w–0, w–1, w–2, etc., from positions 10 to positions 11.

11. Print second digit right angle

For the printing of numeral 4, the solenoid S–3 is energized. In the tens section of the angle coder drum, the switch TA–3 is closed and the top contact of this switch is connected by line 185 to position 11 in Bank 3. Thus, when the wiper w–3 moves from position 10 to position 11, the solenoid S–3 will be energized. This causes the printing of the numeral 4. At the same time, the switch 146 is opened to de-energize the sequence switch solenoid and the wipers of the sequence switch move into positions 12.

12. Print third digit right angle

For printing the numeral 5, the solenoids S-1 and S-3 are energized. The switch AU-1 associated with the units section of the angle coder is closed and the top contact of this switch is connected by line 186 to position 12 in Bank 1. The switch AU-3 is closed and the top contact of this switch is connected by line 187 to position 12 in Bank 3. Thus, when the wipers w-1 and w-3 move from positions 11 to positions 12, the solenoids S-1 and S-3 are energized to print numeral 5. The sequence switch solenoid is de-energized and the sequence switch moves into positions 13.

When the wiper w-0 moves into position 13, the auxiliary relay 76 is de-energized because the position 13 is not connected with line 165. Thus, the movable arms of the contacts 157 and 75 of the auxiliary relay move to the position shown by the dotted lines. With the contacts 157 open, the sequence switch solenoid remains in de-energized condition. With the contact 75 in the position shown by the dotted lines, the coils 71 and 93 of the magnitude and angle servos are connected to the commercial power supply. Also, the supply to the solenoids 123 and 124 of the coders is broken and the feelers are pulled away from the drums.

13. Left unbalance determination

In position 13, all of the printing of the unbalance information for the right correction plane has been completed and the sequence switch remains in position 13 so that the determination of unbalance can be accomplished in the left correction plane.

The balancing machine motor is stopped by pressing the stop button and then the switches 38, 38a and 38b are thrown to the left-hand position. This interconnects the pivots and the pickups for operation in the left-hand correction plane. The balancing machine motor is then started by pressing the start button 36 and the magnitude and angle of unbalance for the left-hand correction plane is automatically shown on the meters 47 and 52 and the memory circuits operate so that the drums of the magnitude and angle coders are positioned in accordance with the unbalance information.

After the needles on the meters 47 and 52 are stabilized, the print button 155 is depressed. This picks up the auxiliary relay 76 through line 154, print button 155, correction plane switch 38b, line 188, position 13 and wiper w-0 on the Bank 0 and line 159. This energizing of the auxiliary relay moves the movable arm of contacts 75 to the full line position and this causes the solenoids 123 and 124 to operate to bring down the feelers associated with the coders and to de-energize the supply to the coils 71 and 93 of the servos.

Also, the movable arm of the contacts 157 closes the sequence switch solenoid circuit. When the print button is released, the auxiliary relay drops out, which causes de-energizing of the sequence switch solenoid, which acts to step the sequence switch from positions 13 to positions 14.

14. Tabulate

On positions 14, the auxiliary relay picks up through lines 153 and 165 and closing contacts 157 and 155 to continue the sequence switch solenoid circuit and the circuit to the coder solenoids 123 and 124 and to open the circuit to the coils 71 and 93 of the servos.

Tabulating is accomplished by energizing of solenoids S-3 and S-4. The positions 14 on Banks 3 and 4 are connected via lines 171 and 166 to the supply line 167, hence, the stepping of the wiper to position 14 energizes the solenoids S-3 and S-4. This causes the carriage to tabulate and at the same time, the switch 146 opens the circuit to the sequence switch solenoid, which causes the sequence switch to step from positions 14 to positions 15.

15. Print first digit right magnitude

The digit to be printed is 6, for this purpose the solenoids S-2 and S-3 are energized. In the tens section of the magnitude coder the switch TU-2 is closed and the top contact of this switch is connected by line 174 to position 15 on Bank 2. The switch TU-3 is closed and the top contact of this switch is connected by line 190 to position 15 on Bank 3. Thus, when the wipers w-2 and w-3 move from positions 14 to positions 15, the solenoids S-2 and S-3 are energized and the numeral 6 is printed. At the same time, the switch 146 is open and the sequence switch is stepped from positions 15 to positions 16.

16. Print second digit left magnitude

For printing the numeral 7, the solenoids S-1, S-2 and S-3 are energized. In the units section of the magnitude coder the switches UM-1, UM-2 and UM-3 are closed. The switch UM-1 is connected by line 191 to position 16 in Bank 1. The switch UM-2 is connected by line 192 to position 16 in Bank 2. The switch UM-3 is connected by line 193 to position 16 in Bank 3. Thus, when the wipers w-1, w-2 and w-3 move from positions 15 to positions 16, the solenoids S-1, S-2 and S-3 are energized to cause printing of the numeral 7. The opening of 146 causes de-energizing of the sequence switch and the wipers move from positions 16 to positions 17.

17. Tabulate

Tabulating is accomplished by the energizing of solenoids S-3 and S-4 and it will be noted that positions 17 on Banks 3 and 4 are interconnected by lines 171 and 166 to the negative supply line 167. Thus, when the wipers w-3 and w-4 move from positions 16 to positions 17, the solenoids S-3 and S-4 are energized. This causes opening of the switch 146, which causes the sequence switch to move from position 17 to position 18.

18. x (multiplier)

As has been indicated heretofore, printing of the letter x is accomplished when solenoids S-1, S-3 and S-4 are energized. The terminals 18 on Banks 1, 3 and 4 are connected via lines 170, 171 and 176 to the negative supply line 167. When the wipers w-1, w-3 and w-4 move from positions 17 to positions 18, these solenoids are energized. The clutch solenoid 144 is energized at this time, which effects the opening of switch 146, which causes the sequence switch to step from positions 18 to positions 19.

19. Print first digit multiplier

Multiplying the numeral 1 is accomplished when solenoid S-1 is energized and this is done when the wiper w-1 moves from positions 18 to positions 19 in Bank 1, since the positions 19 are connected to line 176 in the same manner as explained in connection with position 7 above. Also, at this time the sequence switch is stepped to position 20.

20. Print second digit multiplier

Printing of the numeral 0 is accomplished by the energizing of solenoids S-2 and S-4. When the wipers w-2 and w-4 move from positions 19 to positions 20, these solenoids are energized because the positions 20 are connected to lines 178 and 180 in the same manner as explained in connection with positions 8 above. Also, at this time the sequence switch is stepped to positions 21.

21. Tabulate

Tabulating is done by energizing of solenoids S-3 and S-4 and when the wipers w-3 and w-4 move from positions 20 to positions 21, these solenoids are energized as positions 21 are interconnected to lines 171 and 166, which are connected to the negative supply line 167.

22. Print first digit left angle

The printing of numeral 1 is done by energizing the solenoid S-1. In the hundreds section of the angle coder, the switch HA–1 is closed and the top contact of this switch is connected by line 183 to position 22 on Bank 1. Thus, when the wiper moves from position 21 to position 22, the solenoid is energized. The opening of switch 146 causes the sequence switch to step from positions 22 to positions 23.

23. *Print second digit left angle*

The printing of numeral 8 is done by the energizing of solenoid S–4. In the tens section of the angle coder, the switch TA–4 is closed and this is connected via line 200 to position 23 on Bank 4 of the sequence switch. When the wiper w–4 moves from position 22 to position 23, the solenoid S–4 is energized and the numeral 8 is printed. The switch 146 is opened and the sequence switch is stepped to positions 24.

24. *Print third digit left angle*

The printing of the numeral 5 is accomplished by energizing of solenoids S–1 and S–3. In the units section of the angle coder, the switches UA–1 and UA–3 are closed. The upper contact of switch UA–1 is connected by line 176 to position 24 in Bank 1. The upper contact of switch UA–3 is connected by line 187 to position 24 in Bank 3. Thus, when the wipers w–1 and w–3 step from positions 23 to positions 24, the solenoids S–1 and S–3 are energized. The opening of switch 146 de-energizes the sequence switch 127 and the sequence switch is stepped from positions 24 to 25.

25. *Return carriage*

When the wipers are in position 25, the carriage is returned by the energizing of solenoids S–1, S–2 and S–4. In Bank 1, position 25 is connected by line 170 to the negative supply line 167; in Bank 2, the position 25 is connected by line 169 to the supply line 167; and in Bank 4, the position 25 is connected by line 166 to supply line 167. Thus, when the wipers w–1, w–2 and w–4 move to positions 25, the solenoids S–1, S–3 and S–4 are energized and the carriage is returned.

During the return of the carriage, the switch 148 is opened and the sequence switch solenoid is de-energized so that the wipers w–0, w–1, etc., are stepped into position "C." In this position, the auxiliary relay 76 is also de-energized and the contacts 157 and 75 drop to the positions indicated by the dotted lines. The contact 157 opens the sequence solenoid circuit and the contact 75 opens the circuit to the coder solenoids 123 and 124 and closes the circuit to the coils 71 and 93 of the servo motors.

At this time the balancing machine motor can be stopped by pressing the stop button 35 and both pivots engaged by turning the switch 38 to the "off" position. Actuation of switch 38 also turns switches 38a and 38b to the "off" position and the contacts M3–1 and M4–1 (Figure 3) short the pickup coils 16a and 17a.

The test piece now may be taken out of the machine and a new one inserted and another testing operation carried out.

I claim:

1. In equipment for recording on an automatic typewriter unbalance information of a test article: a power supply; an automatic typewriter having a carriage; a plurality of solenoids selectively energized by said power supply for the purpose of causing said typewriter carriage to "tabulate" and to "return," to cause said typewriter to print a character indicating multiplication, to print a multiplying factor, and to print digits indicating magnitude and angle of unbalance in a test article; a plural bank sequence switch adjustable to any of a plurality of operating positions and having electrical connections with each of said solenoids for the selective energizing thereof; electrical connections between said power source and said sequence switch; electrical connections interconnected with a predetermined number of said solenoids by the sequence switch when the same is in a predetermined adjusted position to energize the interconnected solenoids for causing said carriage to "return"; electrical connections between said power source and said sequence switch interconnected with a predetermined number of said solenoids by said sequence switch when the same is in a predetermined adjusted position to energize the interconnected solenoids for causing said carriage to "tabulate"; electrical connections between said power source and said sequence switch interconnected with a predetermined number of said solenoids by said sequence switch when the same is in a predetermined adjusted position to energize the interconnected solenoids for causing the printing of a character indicating multiplication; a range selector switch adjustable to any of a plurality of operating positions which are selectively interconnected between said power source and said solenoids by said sequence switch when the same is in a predetermined adjusted position, the operating position of the range selector switch determining which of said solenoids is energized and the energizing of the solenoids causing the printing of a multiplication factor; a magnitude coder having a plurality of switches adapted to be selectively actuated in accordance with the magnitude of unbalance in a test article and which are selectively interconnected between said power source and said solenoids by said sequence switch when the same is in a predetermined adjusted position, the actuated switches determining the energizing of said solenoids for causing the printing of digits indicating the magnitude of unbalance; and an angle coder having a plurality of switches adapted to be selectively actuated in accordance with the angle of unbalance in a test article and which are selectively interconnected between said power source and said solenoids by said sequence switch when the same is in a predetermined adjusted position, the actuated switches determining the energizing of said solenoids for causing the printing of digits indicating angle of unbalance.

2. In equipment for recording on an automatic typewriter unbalance information of a test article: a power supply; an automatic typewriter; a plurality of solenoids selectively energized by said power supply for the purpose of causing said typewriter to print digits indicating magnitude and angle of unbalance in a test article; a plural bank sequence switch adjustable to a plurality of operating positions and having electrical connections with each of said solenoids for the selective energizing thereof; a magnitude coder having a plurality of switches adapted to be selectively actuated in accordance with the magnitude of unbalance in a test article and which are selectively interconnected between said power source and said solenoids by said sequence switch when the same is in a predetermined adjusted position, the actuated switches determining the energizing of said solenoids for causing the printing of digits indicating the magnitude of unbalance; and an angle coder having a plurality of switches adapted to be selectively actuated in accordance with the angle of unbalance in a test article and which are selectively interconnected between said power source and said solenoids by said sequence switch when the same is in a predetermined adjusted position, the actuated switches determining the energizing of said solenoids for causing the printing of digits indicating angle of unbalance.

3. In equipment for recording on an automatic typewriter unbalance information of a test article: a power supply; a first group of four switches connected with the power supply and adapted to be selectively actuated in accordance with the magnitude of unbalance in a test article; a second group of four switches connected with the power supply and adapted to be selectively actuated at substantially the same time as said first group and in accordance with the magnitude of unbalance in a test article; four banks of sequence switches operable in unison, each bank having two switches serially actuated after the actuation of said first and second groups of switches;

four solenoids each respectively connected with said banks of sequence switches and adapted to be selectively interconnected with switches of said first and second groups by the sequence switch; connections between the switches of said groups and the switches of said banks arranged whereby first corresponding switches in each bank are connected to the switches in said first group and second corresponding switches in each bank are connected to the switches in said second group; and means interconnected with said solenoids and said sequence switches adapted to operate the sequence switches when any of said solenoids is energized.

4. In equipment for recording on an automatic typewriter unbalance information of a test article: a power supply; a first group of four switches connected with the power supply and adapted to be selectively actuated in accordance with the angle of unbalance in a test article; a second group of four switches connected with the power supply and adapted to be selectively actuated in accordance with the angle of unbalance in a test article; a third group of four switches connected with the power supply and adapted to be selectively actuated in accordance with the angle of unbalance in a test article said three groups being actuated substantially at the same time; four banks of sequence switches operable in unison, each bank having three switches serially actuated after the actuation of said groups; four solenoids each respectively connected with said banks of sequence switches and adapted to be selectively inter-connected with switches of said groups by the sequence switch; connections between the switches of said groups and the switches of said banks arranged whereby first corresponding switches in each bank are connected to the switches in said first group, second corresponding switches in each bank are connected to the switches in said second group, and third corresponding switches in each bank are connected to the switches in said third group; and means interconnected with said solenoids and said sequence switches adapted to operate the sequence switches when any of said solenoids is energized.

5. In equipment for recording on an automatic typewriter unbalance information of a test article: a power supply; a plurality of groups of switches connected with the power supply, each group having the same number of switches adapted to be substantially simultaneously selectively actuated in accordance with unbalance of a test article; a plurality of banks of sequence switches operable in unison, the number of banks being the same as the number of switches in a group, each bank having a number of switches corresponding to the number of groups of switches and serially actuated after the actuation of said groups; a plurality of solenoids corresponding to the number of said banks, each respectively connected with the banks and adapted to be selectively interconnected with switches of said groups by the sequence switch; connections between the switches of said groups and the switches of said banks whereby the plurality of corresponding switches in each bank are respectively connected to the switches of the groups; and means interconnected with said solenoids and said sequence switches adapted to operate the sequence switches when any of said solenoids is energized.

6. In equipment for recording on an automatic typewriter unbalance information of a test article: a power supply; a magnitude servomotor including a shaft positionable in accordance with the magnitude of unbalance in a test article and a coil; circuit means for supplying power to said coil; an angle servo including a shaft positionable in accordance with the angle of unbalance in a test article and a coil connected with said circuit means; a magnitude coder including a rotary member having a sculptured peripheral surface which is arranged to form a predetermined code and a plurality of switches adapted to be brought into engagement with said surface and be actuated in accordance with the code; an angle coder including a rotary member having a sculptured peripheral surface which is arranged to form a predetermined code and a plurality of switches adapted to be brought into engagement with last said surface and be actuated in accordance with the code; a magnitude coder solenoid adapted to cause engagement of the switches and the surface of said magnitude coder, the solenoid being connected with said circuit means; an angle coder solenoid adapted to cause said engagement of the switches and the surface of said angle coder, the solenoid being connected with said circuit means; a control switch operative to simultaneously open the supply circuit to the coils on said magnitude and angle servos and to close the supply circuit to said magnitude and angle solenoids and vice versa; a plurality of solenoids adapted to be selectively energized from said power source; a sequence switch adapted to step through a plurality of positions and operative to selectively complete circuits to last said solenoids alternatively directly from said power supply and from said power supply through switches of said coders; and means connected with said sequence switch adapted to operate said control switch.

7. In equipment for recording on an automatic typewriter unbalance information of a test article: a power supply; controllable determining mechanism to measure the magnitude and angle of unbalance in a test article; a first shaft connected with said mechanism and angularly positionable in accordance with the magnitude of unbalance in the article; a second shaft connected with said mechanism and angularly positionable in accordance with the angle of unbalance in the article; a magnitude coder including drum means connected with said first shaft, the drum means having sculptured peripheral surfacing which is arranged to form a predetermined code and further including a plurality of controllable switches connected with said power supply and adapted to be brought into engagement with said surfacing to be selectively actuated in accordance with the angular position of the shaft; an angle coder including drum means connected with said second shaft, the drum means having sculptured peripheral surfacing which is arranged to form a predetermined code and further including a plurality of controllable switches connected with said power supply and adapted to be brought into engagement with last said surfacing to be selectively actuated in accordance with the angular position of the shaft; a plurality of solenoids adapted to be selectively energized from said power source; a controllable sequence switch adapted to step through a plurality of positions and operative to selectively complete circuits to last said solenoids alternatively directly from said power supply and from said power supply through switches of said coders; and control means to alternatively independently control the time of operation of said determining mechanism and the time of operation of said sequence switch.

8. In equipment for recording on an automatic typewriter unbalance information of a test article: a power supply; an automatic typewriter; a magnitude servomotor having a shaft adapted to be angularly positioned in accordance with the magnitude of unbalance in a test article; an angle servomotor having a shaft adapted to be angularly positioned in accordance with the angular location of unbalance in a test article; a first coder having a coded rotatable member connected with and operated by the shaft of said magnitude servo and further having a plurality of switches engageable with the coded member to be selectively closable in accordance with the angular position of said rotatable member, each switch being connected with said power supply; a second coder having a rotatable coded member connected with and operated by the shaft of said angle servo and having a plurality of switches engageable with the coded member to be selectively closable in accordance with the angular position of last said rotatable member, each switch being connected with said power supply; sequencing means including a plurality of banks of fixed contacts, each bank having a wiper movable thereover, the fixed contacts being connected with said switches and said power supply in a predetermined manner; and a plurality of solenoids for use in controlling printing function of said typewriter, each solenoid respectively electrically connected with said wipers, the sequencing means being arranged to selectively electrically interconnect closed switches on said first and second coders with said solenoids.

9. In equipment for recording on an automatic typewriter unbalance information of a test article: first mechanism to determine and indicate the moment of unbalance in a test article; an automatic typewriter; second mechanism to control said typewriter for the recording of said moment of unbalance including a plurality of solenoids adapted to be selectively energized; coder mechanism having elements selectively actuated in accordance with said moment of unbalance to effect selective energizing of said solenoids; and a sequence switch adapted to interconnect, at predetermined intervals of time, said solenoids with the actuated elements of said coder mechanism whereby the solenoids are selectively energized; and control means connected with said first mechanism and with said second mechanism and adapted alternatively to cause said first mechanism to function while said second mechanism is dormant and to cause said second mechanism to function while said first mechanism is dormant.

10. In equipment for recording on an automatic typewriter information of the condition of a test article: a power supply; an automatic typewriter; a plurality of solenoids selectively energized from said power supply for the purpose of causing said typewriter to print characters indicating a first condition and a second condition of a test article, a plural bank sequence switch adjustable to any of a plurality of operating positions and having electrical connections with each of said solenoids for selective energizing thereof; a first coder having a plurality of switches adapted to be selectively actuated in accordance with said first condition and the switches being selectively interconnected between said power supply and said solenoids by said sequence switch when the same is in a predetermined adjusted position, the actuated switches determining the energizing of said solenoids for causing the printing of characters indicating said first condition; and a second coder having a plurality of switches adapted to be selectively actuated in accordance with said second condition and the switches being selectively interconnected between said power supply and said solenoids by said sequence switch when the same is in a predetermined adjusted position, the actuated switches determining the energizing of said solenoids for causing the printing of characters indicating said second condition.

11. In equipment for recording on an automatic typewriter information of the condition of a test article: a power supply; an automatic typewriter having a carriage; a plurality of solenoids selectively energized by said power supply for the purpose of causing said typewriter carriage to tabulate and to return, to cause said typewriter to print a character indicating multiplication, to print a multiplying factor, and to print digits indicating a first condition and a second condition of a test article; a plural bank sequence switch adjustable to any of a plurality of operating positions and having electrical connections with each of said solenoids and for the selective energizing thereof; electrical connections between said power supply and said sequence switch interconnected with a predetermined number of said solenoids by the sequence switch when the same is in a predetermined adjusted position to energize the interconnected solenoids for causing said carriage to "return"; electrical connections between said power supply and said sequence switch interconnected with a predetermined number of said solenoids by the sequence switch when the same is in a predetermined adjusted position to energize the interconnected solenoids for causing said carriage to "tabulate"; electrical connections between said power supply and said sequence switch interconnected with a predetermined number of said solenoids by the sequence switch when the same is in a predetermined adjusted position to energize the interconnected solenoids for causing the printing of a character indicating multiplication; a range selector switch adjustable to any of a plurality of operating positions which are selectively interconnected between said power source and said solenoids by said sequence switch when the same is in a predetermined adjusted position, the operating position of the range selector switch determining which of said solenoids is energized, the energizing of the solenoids causing the printing of a multiplication factor; a first coder having a plurality of switches adapted to be selectively actuated in accordance with the said first condition and which are selectively interconnected between said power source and said solenoids by said sequence switch when the same is in a predetermined adjusted position, the actuated switches determining the energizing of said solenoids for causing the printing of digits indicating said first condition; and connections including a second coder having a plurality of switches adapted to be selectively actuated in accordance with said second condition and which are selectively interconnected between said power source and said solenoids by said sequence switch when the same is in a predetermined adjusted position, the actuated switches determining the energizing of said solenoids for causing the printing of digits indicating said second condition.

References Cited in the file of this patent

UNITED STATES PATENTS

| | | |
|---|---|---|
| 1,665,060 | Hitchcock | Apr. 3, 1928 |
| 1,888,268 | Hershey | Nov. 22, 1932 |
| 2,126,025 | Muehter | Aug. 9, 1938 |
| 2,142,251 | Nunan | Jan. 3, 1939 |
| 2,243,379 | Johnson | May 27, 1941 |
| 2,313,752 | Le Clair | Mar. 16, 1943 |
| 2,331,733 | Senger | Oct. 12, 1943 |
| 2,672,598 | Hornfeck | Mar. 16, 1954 |
| 2,701,748 | Anderson | Feb. 8, 1955 |
| 2,726,130 | Meadows | Dec. 6, 1955 |
| 2,783,648 | Stovall et al. | Mar. 5, 1957 |